United States Patent [19]

Makita

[11] 4,305,072

[45] Dec. 8, 1981

[54] ROTATIONAL POSITION DETECTOR

[75] Inventor: Kunio Makita, Chiryu, Japan

[73] Assignee: Nippondenso Co., Ltd., Kariya, Japan

[21] Appl. No.: 29,535

[22] Filed: Apr. 12, 1979

[30] Foreign Application Priority Data

Jun. 15, 1978 [JP] Japan ................................ 53/72753

[51] Int. Cl.³ .......................... G08C 19/06; G01B 7/00
[52] U.S. Cl. ............................... 340/870.31; 310/168;
324/208; 324/174; 324/60 CD; 340/347 P
[58] Field of Search ................... 340/195, 196, 177 R,
340/672, 347 M, 347 P, 870.31, 870.32, 870.01;
310/168, 171, 172; 324/239, 260, 173, 174, 208,
60 CD; 328/1; 33/1 PT; 235/103, 103.5 R

[56] References Cited

U.S. PATENT DOCUMENTS

| | | | |
|---|---|---|---|
| 3,132,337 | 5/1964 | Martin | 340/347 P |
| 3,728,565 | 4/1973 | O'Callaghan | 340/195 |
| 3,832,635 | 8/1974 | Cass | 324/174 |
| 3,876,927 | 4/1975 | Gee et al. | 340/195 |
| 3,930,201 | 12/1975 | Ackermann et al. | 340/195 |
| 4,072,893 | 2/1978 | Huwyler | 324/208 |
| 4,181,884 | 1/1980 | Shirasaki et al. | 324/208 |

*Primary Examiner*—James J. Groody
*Attorney, Agent, or Firm*—Cushman, Darby & Cushman

[57] ABSTRACT

A single sensor is located close to a ring gear on the periphery of which teeth are disposed equiangularly except at an angular reference position. When the ring gear rotates, the sensor generates output signals, with the period of the output pulse which corresponds to the reference position being larger than that of the other output pulses which correspond to the angular positions. A capacitor is charged during half of each the periods of the output pulses, so that the reference position can be discriminated by comparing the amplitude of the charged voltage or the discharging period of the capacitor with a predetermined value.

4 Claims, 9 Drawing Figures

→ TIME

4,305,072

ROTATIONAL POSITION DETECTOR

BACKGROUND OF THE INVENTION

The invention relates to a rotational position detector for detecting a rotational angle and a rotational reference position of a rotary shaft used, for example, in an internal combustion engine.

In a known rotational position detector for an internal combustion engine, for example, a disc rotating in synchronism with the rotation of the internal combustion engine is provided with teeth-like projections equiangularly disposed. A couple of sensors are used; one for sensing the projections and the other for sensing a reference position. This type of rotational position detector, however, is costly because of the use of two sensors, and suffers from a position error in the sensed signal because of the distance error between the two sensors.

SUMMARY OF THE INVENTION

Accordingly, an object of the invention is to provide a rotational position detector with a single rotating body and single sensor, which can provide an accurate reference signal and an angular signal.

To achieve the above-mentioned object, the rotational position detector according to the invention uses a rotating body with a number of pieces representing angular information for providing the angular information, which are equiangularly disposed on the peripheral portion of the rotating body, only lacking a piece representing angular information at a predetermined reference position. The angular information of the rotating body is detected by a single sensor. The rotary position detector detects a state that the period of an output signal of the sensor abruptly changes at the reference position and produces a reference signal.

DESCRIPTION OF THE PREFERRED EMBODIMENTS

Figure 1:
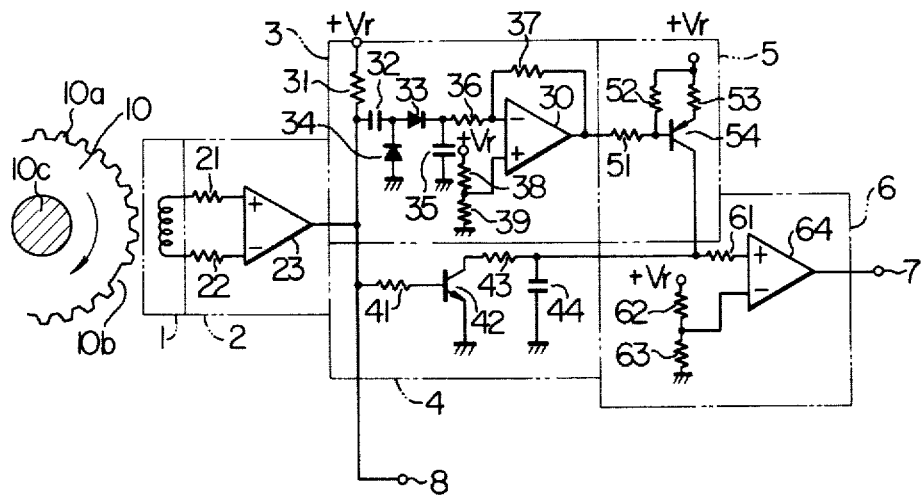
FIG. 1 shows a circuit diagram of an embodiment of a rotational position detector according to the invention.

Reference is made to FIG. 1 illustrating an embodiment of a rotational position detector according to the invention. In the figure, reference numeral 10 designates a disc with a number of teeth or projections 10a disposed on the peripheral portion of the disc, only lacking a tooth or projection piece 10a which is disposed at the reference position 10b. The disc 10 is driven by a crankshaft 10c of an internal combustion engine (not shown). An electric power generator type magnetic pickup designated by numeral 1 to pickup signals from the teeth 10a is disposed close to the disc 10, facing the teeth 10a. A wave-shaping circuit 2 wave-shapes a rectangular wave of a signal from the pickup 1, including resistors 21 and 22 and a comparator 23. A frequency to voltage (F-V) converter 3 converts output pulsating signals corresponding to the rotational speed of the engine, which is produced by the wave-shaping circuit 2 into a voltage, the converter 3, including resistors 31, 36 to 39, a differential amplifier 30, capacitors 32 and 35, and diodes 33 and 34. A saw-tooth wave generating circuit 4 for generating a saw-tooth wave signal by charging a capacitor includes resistors 41 and 43, a transistor 42, and a capacitor 44. A charging circuit 5 charges the capacitor 44 by changing the current fed to the saw-tooth wave generating circuit in accordance with the output voltage from the F-V converging circuit 3. The charging circuit 5 has resistors 51 to 53 and a transistor 54. A reference numeral 6 designates a comparing circuit which judges whether the peak value of the saw-tooth wave signal produced from the saw-tooth wave signal generating circuit 4 is above or below a given value and produces a reference position signal in accordance with the result of the comparison, the comparing circuit 6 having resistors 61 to 63 and a comparator 64. Numeral 7 designates a reference position signal output terminal and 8 for an angle signal output terminal. In the figure, +Vr designates a terminal to which a positive constant voltage from a constant voltage power source (not shown) is applied.

Figure 2:
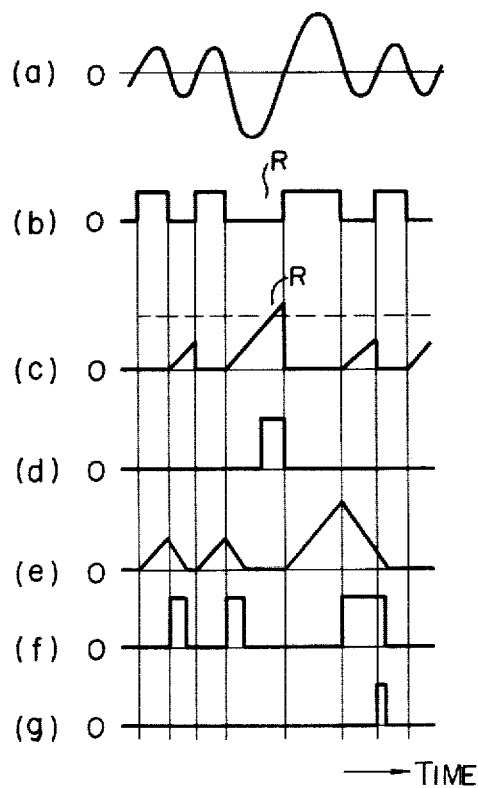
FIGS. 2(a)–2(g) show a set of waveforms useful in explaining the operation of the circuit shown in FIG. 1.

The operation of the circuit thus constructed will be described. A waveform shown in FIG. 2(a) is the one of a signal picked up by the magnetic pickup 1 close to the iron disc 10 with no tooth 10a at the reference position 10b. The picked up signal represents angular information of any one of the teeth 10a provided on the peripheral portion of the disc 10. The angular information signal is wave-shaped by the waveshaping circuit 2 to have a waveform shown in FIG. 2(b). The signal with such a waveform appears as an angular signal at the output terminal 8. When the rectangular wave angular signal is at low level, the transistor 42 is turned off so that the capacitor 44 is charged by the charge current circuit 5. When the angular signal is at high level, the transistor 42 is turned on so that the capacitor 44 rapidly discharges to form a saw-tooth wave signal. The current in the charge current circuit 5 is so controlled by the F-V converter 3 that the peak value of the saw-tooth wave signal is kept constant irrespective of the rotational speed of the disc 10. In operation, as the engine rotational speed increases and thus the frequency of the angular pulse signals increases, the voltage across the capacitor 35 rises while the output voltage of the amplifier 30 falls. As a result, the current flowing through the transistor 54 increases thereby to keep constant the peak value of the saw-tooth wave signal. When the pickup 1 confronts with the reference position 10b with no tooth like projecting piece 10a, the amplitude and the period of the signal developed in the pickup 1 increase as shown in FIG. 2(a) and the period of the rectangular wave signal becomes two times as long as those of the remaining or ordinary rectangular wave signals, as shown by character R in FIG. 2(b). Accordingly, the peak voltage of the saw-tooth wave signal also becomes two times as high as those of the remaining or ordinary saw-tooth wave signals. When a voltage set up by the resistors 62 and 63 is selected to be 1.5 times the peak voltage of the ordinary saw-tooth wave signals, as shown in FIG. 2(c), the saw-tooth wave signal exceeds in its amplitude the selected value, so that the output signal of the comparator 6 is inverted to be a high level signal with a waveform as shown in FIG. 2(d). As a result, a reference position signal as shown in FIG. 2(d) is derived from the reference position signal output terminal 7.

The above-mentioned example is so designed that the saw-tooth wave signal and the set voltage are compared by the comparing circuit 6. Alternatively, a set voltage which is at given times as large as the peak voltage of a previously sampled saw-tooth wave signal, may be used in place of the set voltage. In this case, the capacitor is charged by a constant current, without changing the charging current fed to the saw-tooth wave generating circuit 4 in accordance with the engine rotational speeds.

Figure 3:
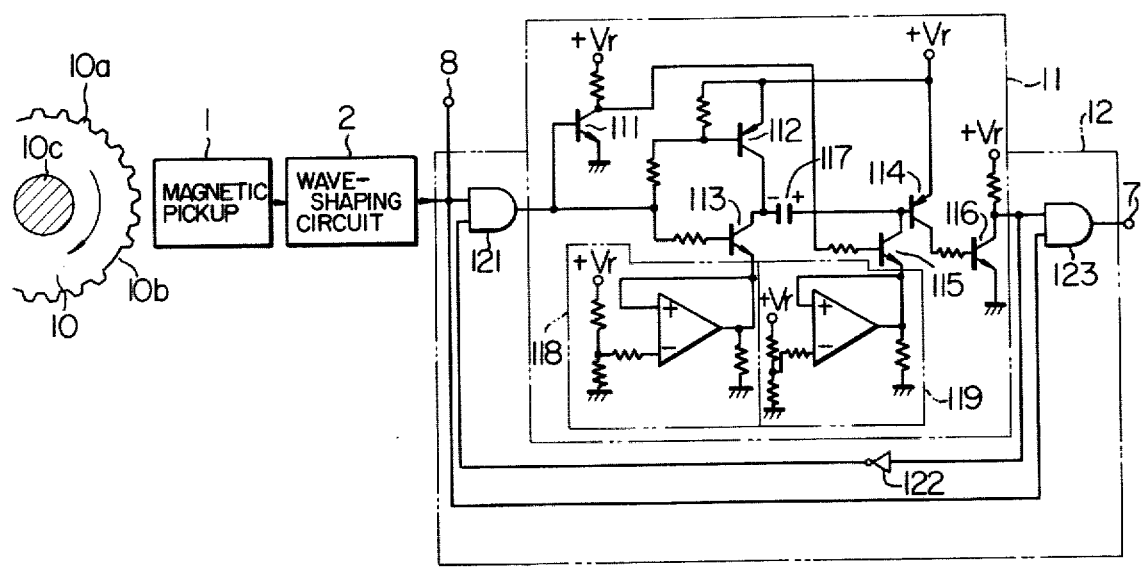
FIG. 3 shows a circuit diagram of another embodiment of the rotational position detector according to the invention.

Turning now to FIG. 3, there is shown a second embodiment of the rotational position detector according to the invention, in which like numerals are used to designate like portions in FIG. 1. In the figure, a capacitor charging circuit 11 includes transistors 111 to 116, a capacitor 17 and constant current circuits 118 and 119. A gate circuit 12 includes an AND circuit 121, an inverter 122 and an AND circuit 123.

The operation of the rotational position detector mentioned above will be described. The output signals as shown in FIGS. 2(a) and 2(b) appear at the magnet pickup 1 and the waveshaping circuit 2, as in the case of the first embodiment. When the angular signal outputted from the waveshaping circuit 2 becomes at high level, the transistor 116 is turned on and the output signal of the inverter 122 becomes at high level. Therefore, the output signal of the AND circuit 121 becomes at high level and the transistors 111 and 113 are turned on while the transistor 112 is turned off. The turning-on of the transistor 111 causes the transistor 115 to turn off. As a result, the capacitor 117 is charged with the polarity shown in the figure, as shown in FIG. 2(e), by a constant current determined by the constant current circuit 118 through the emitter-base path of the transistor 114 and the transistor 113. At this time, the current flow through the emitter-base path of the transistor 114 renders the transistor 114 conductive and then the transistor 116 conductive. The collector potential of the transistor 116 maintains a low level, as shown in FIG. 2(f) and also the output signal of the AND circuit 123 maintains a low level. When the angular signal outputted from the waveshaping circuit 2 becomes at low level, the output signal of the AND circuit 121 becomes at low level to turn off the transistors 111 and 113 but to turn on the transistor 112. The turning-off of the transistor 111 causes the transistor 115 to turn on. A constant current determined by the constant current circuit 119 through the transistors 112 and 115 causes the capacitor 117 to discharge as shown in FIG. 2(e). As a result, the base potential of the transistor 114 becomes high during the discharging period to turn off the transistor 114 and the then transistor 116 to turn off. Therefore, the collector potential of the transistor 116 becomes high, as shown in FIG. 2(f). Upon the discharging of the capacitor 117, the base potential of the transistor 114 becomes at a low potential so that the transistor 114 is again turned on to cause the transistor 116 to become conductive. As a result, the collector potential of the transistor 116 becomes at low level. When the magnet pickup 1 confronts with the portion of the disc 10 where the teeth 10a are provided, the angular signal of the waveshaping circuit 2 has a short period so that the charged voltage of the capacitor 117 is low. Thus, in case where the discharging of the capacitor 117 is completed before the capacitor 117 is then charged, the output of the AND circuit 123 maintains the low level. However, when the magnetic pickup 1 confronts with the reference position 10b of the disc 10 where no tooth like piece 10a is provided, the period of the output signal of the wave-shaping circuit 2 is long, that is, its period is the double of that in the former case. For this reason, the charged voltage of the capacitor 117 is high and the discharge of the capacitor 117 is not completed at the time that the capacitor 117 is to be next charged. Thus, the collector potential of the transistor 116 is kept at high level, as shown in FIG. 2(f). The output signal of the AND circuit 121 is kept at low level, through the inverter 122. As a result, the capacitor 117 continues its discharge so that the output signal of the AND circuit 123 becomes at high level, as shown in FIG. 2(g). Accordingly, a reference signal as shown in FIG. 2(g) is derived from the reference position signal output terminal 7 connecting to the output side of the AND circuit 123.

The embodiments mentioned above employ the disc 10 with a number of teeth-like projecting pieces 10a equiangularly disposed therearound, but lacking a single projecting piece 10a, for the purpose of angular and reference position signals. However, an alternation is permitted within the scope of the invention, in which a magnetic disc is used with a number of magnetic poles equiangularly disposed therearound and with a single magnetic pole of weak magnetization or no magnetic pole at the reference position thereof. The number of the reference position is not limited to a single one but a suitable number thereof may be used, if necessary. The magnetic pickup 1 as the sensor may be replaced by any other suitable means such as a Hall element, a magnetic-electric converting element or photoelectric converting element.

I claim:

1. A rotational position detector comprising:
   a rotating body having a plurality of angular information elements equiangularly disposed therearound except at a predetermined angular reference position;
   sensor means disposed close to said rotating body for sensing said angular information elements, said sensor means producing an output signal of a relatively short period when said sensor means senses each of said angular information elements and an output signal of a relatively long period when said sensor means senses the absence of said angular information elements; and
   circuit means connected to said sensor means for generating an output signal representing the reference position, said circuit means including a capacitor and means for controlling the amount of charge on said capacitor in relation to the periods of the output signals of said sensor means, said reference position representing output signal being generated when said amount of charge on said capacitor crosses a predetermined value.

2. A rotational position detector according to claim 1, wherein said reference position signal generating means includes:
   a waveshaping circuit connected to said sensor means for shaping the output signal of said sensor means to produce an output signal representing a predetermined rotational angle;
   a frequency-voltage converter circuit connected to said waveshaping circuit for converting the frequency of the output signal of said waveshaping circuit into a voltage;
   a saw-tooth wave generating circuit connected to said waveshaping circuit for generating a saw-tooth wave voltage;

a charging current circuit connected to said frequency-voltage converter circuit and said saw-tooth wave generating circuit, for varying a charging current to said capacitor in accordance with the output signal of said frequency-voltage converter circuit, to regulate the peaks of said saw-tooth wave voltages; and a comparator circuit connected to said saw-tooth wave generating circuit for comparing said saw-tooth wave voltage with a reference voltage to produce said reference position representing signal.

3. A rotational position detector comprising:

a rotating body having a plurality of angular information elements equiangularly disposed therearound except at a predetermined angular reference position;

sensor means disposed close to said rotating body for sensing said angular information elements, said sensor means producing an output signal exhibiting a relatively small change when said sensor means senses said angular information elements and a relatively large change the absence of said angular information elements;

a waveshaping circuit connected to said sensor means for shaping the output signal of said sensor means to produce an output signal representing a predetermined rotational angle;

capacitor charge/discharge means including a capacitor, a first circuit for charging said capacitor and a second circuit for discharging said capacitor; and gate means connected to said waveshaping circuit and said capacitor charge/discharge means, said gate means including a first gate circuit for inhibiting the output signal of said waveshaping circuit to be applied to said capacitor charge/discharge means while the capacitor in said capacitor charge/discharge means is charging, and a second gate circuit for producing a reference position representing signal while the output signal of said waveshaping circuit appears, and at the same time the capacitor in said capacitor charge/discharge means is discharging.

4. A rotational position detector comprising:

a rotatably iron disk having a plurality of equiangular teeth provided circularly except at a predetermined position;

pick-up means electromagnetically associated with said rotatable disk for generating an angular pulse signal in synchronism with the passing of said teeth therethrough;

first transistor means connected to said pick-up means for conducting and nonconducting during the respective presence and absence of said angular pulse signal;

second transistor means connected to said pick-up means for conducting and nonconducting during the respective absence and presence of said angular pulse signal;

a capacitor connected to said first and second transistor means for charging and discharging during the respective conductions of said first and second transistor means;

third transistor means for producing an output pulse signal during the discharging of said capacitor; and gate means connected to said pick-up means and said third transistor means for producing a reference position signal during the presences of said angular pulse signal and said output pulse signal.

* * * * *